(12) United States Patent
Fulayter et al.

(10) Patent No.: US 10,273,903 B2
(45) Date of Patent: Apr. 30, 2019

(54) ENGINE NACELLE

(71) Applicants: Rolls-Royce Corporation, Indianapolis, IN (US); Rolls-Royce North American Technologies, Inc., Indianapolis, IN (US)

(72) Inventors: Roy D. Fulayter, Avon, IN (US); Crawford F. Smith, III, Carmel, IN (US)

(73) Assignees: Rolls-Royce Corporation, Indianapolis, IN (US); Rolls-Royce North American Technologies Inc., Indianapolis, IN (US)

( * ) Notice: Subject to any disclaimer, the term of this patent is extended or adjusted under 35 U.S.C. 154(b) by 437 days.

(21) Appl. No.: 15/076,113

(22) Filed: Mar. 21, 2016

(65) Prior Publication Data
US 2016/0290282 A1    Oct. 6, 2016

Related U.S. Application Data

(60) Provisional application No. 62/140,901, filed on Mar. 31, 2015.

(51) Int. Cl.
| | |
|---|---|
| F02K 1/38 | (2006.01) |
| F01D 17/10 | (2006.01) |
| F01D 25/24 | (2006.01) |
| B64D 33/02 | (2006.01) |
| B64C 23/00 | (2006.01) |
| F15D 1/00 | (2006.01) |

(52) U.S. Cl.
CPC .............. *F02K 1/38* (2013.01); *B64C 23/005* (2013.01); *B64D 33/02* (2013.01); *F01D 17/10* (2013.01); *F01D 25/24* (2013.01); *B64D 2033/0226* (2013.01); *F05D 2220/323* (2013.01); *F15D 1/0075* (2013.01)

(58) Field of Classification Search
CPC .................................. F02K 1/38; F15D 1/0075
See application file for complete search history.

(56) References Cited

U.S. PATENT DOCUMENTS

| | | |
|---|---|---|
| 2,694,357 A | 11/1954 | Lee |
| 3,664,612 A | 5/1972 | Skidmore et al. |
| 3,770,228 A | 11/1973 | Traksel et al. |
| 4,749,150 A | 6/1988 | Rose et al. |
| 5,156,362 A | 10/1992 | Leon |
| 5,447,283 A | 9/1995 | Tindell |
| 6,179,251 B1 | 1/2001 | Tindell et al. |
| 7,870,721 B2 | 1/2011 | Winter et al. |

(Continued)

FOREIGN PATENT DOCUMENTS

CN            103625639 A        3/2014

OTHER PUBLICATIONS

Extended European Search Report, European Application No. 16160912.8-1757, dated Oct. 11, 2016, 9 pages.

(Continued)

*Primary Examiner* — Christopher Verdier
*Assistant Examiner* — Jason G Davis
(74) *Attorney, Agent, or Firm* — Barnes & Thornburg LLP

(57) ABSTRACT

A nacelle for a gas turbine jet engine for an aircraft includes plasma actuators that act as flow disruptors to provide boundary layer turbulence when the engine is exposed to air flow that is obtuse or perpendicular to direction of travel of the engine.

15 Claims, 3 Drawing Sheets

(56) References Cited

U.S. PATENT DOCUMENTS

| | | | |
|---|---|---|---|
| 8,186,942 | B2 | 5/2012 | Haas |
| 8,192,147 | B2 | 6/2012 | Haas |
| 8,282,037 | B2 | 10/2012 | Jain |
| 8,348,199 | B2 | 1/2013 | Sheaf et al. |
| 8,402,739 | B2 | 3/2013 | Jain et al. |
| 8,408,491 | B2 | 4/2013 | Jain et al. |
| 8,434,724 | B2 | 5/2013 | Chelin et al. |
| 8,529,188 | B2 | 9/2013 | Winter |
| 8,596,573 | B2 | 12/2013 | Jain |
| 10,072,511 | B2 | 9/2018 | Fulayter et al. |
| 2007/0241229 | A1 | 10/2007 | Silkey et al. |
| 2008/0023589 | A1* | 1/2008 | Miles ............ B64C 23/005 244/205 |
| 2009/0173837 | A1 | 7/2009 | Silkey et al. |
| 2011/0103969 | A1 | 5/2011 | Sheaf et al. |
| 2011/0253842 | A1 | 10/2011 | Silkey et al. |

OTHER PUBLICATIONS

Gorton, Susan; Owens, Lewis; Jenkins, Luther; Allan, Brian; Schuster, Ernest; Active Flow Control on a Boundary-Layer-Ingesting Inlet; American Institute of Aeronautics and Astronautics; pp. 1-12.

* cited by examiner

ENGINE NACELLE

CROSS REFERENCE TO RELATED APPLICATIONS

This application claims priority to and the benefit of U.S. Provisional Patent Application No. 62/140,901, filed 31 Mar. 2015, the disclosure of which is now expressly incorporated herein by reference.

FIELD OF THE DISCLOSURE

The present disclosure relates generally to a housing for a gas turbine engine for aircraft, and more specifically to a housing for a gas turbine engine for aircraft that includes nacelle inlet lip boundary layer energization.

BACKGROUND

Gas turbine engines are used to power aircraft. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Leftover products of the combustion are exhausted out of the turbine and may provide thrust in some applications.

At cruising speed, the flow of air to the engine passes through an opening in the engine nacelle to engine intake. The engine intake generally has a fan with a number of blades that rotate to work the air. Air flow, such as crosswind, for example, that travels in a direction obtuse from the line of flight of the engine may result in laminar separation as the flow passes over portions of the nacelle. This laminar separation tends to create a pressure gradient within the air flow to the fan, causing variations in pressure along the fan blade.

SUMMARY

The present disclosure may comprise one or more of the following features and combinations thereof.

A nacelle for a jet engine may include an inner surface defining an opening for air to flow to an engine intake, an outer surface positioned external to the inner surface, a leading surface circumscribing the opening, the leading surface connecting the inner surface and the outer surface. The leading surface may define a line of stagnation. At least one plasma actuator may be positioned to disrupt the air flow over the leading surface to reduce laminar separation of air flowing into the engine intake.

In some embodiments, the at least one plasma actuator may be positioned at the leading surface and aligned along the line of stagnation.

In some embodiments, the at least one plasma actuator may be configured to vary the momentum imparted to the air flowing over the leading surface.

In some embodiments, the at least one plasma actuator may comprise a plurality of plasma actuators positioned about the opening on the leading surface of the nacelle. The plurality of plasma actuators may be aligned along the line of stagnation.

In some embodiments, each of the plurality of plasma actuators may be independently operable to control the momentum imparted to the air flowing over the leading surface at each plasma actuator.

A housing for a turbine engine may include an opening directing a flow of air to an engine intake, an outer surface, and a plurality of plasma actuators. The flow of air may be generally parallel to the engine's axis of rotation. The plurality of plasma actuators may each be positioned to disrupt a flow of air that has a direction that is oblique to the engine's axis of rotation.

In some embodiments, the plasma actuators may be positioned at the leading surface. The plasma actuators may be aligned along a line of stagnation.

In some embodiments, the plurality of plasma actuators are each configured to vary the momentum imparted to the air flowing over the leading surface.

In some embodiments, the plurality of plasma actuators are configured such that each plasma actuator may operate independently to vary the momentum imparted to the air flowing over the leading surface.

In some embodiments, the plurality of plasma actuators are each configured to vary the momentum imparted to the air flowing to the engine intake.

A component for housing for a jet engine may include a leading surface, and a plurality of plasma actuators. The plasma actuators may be positioned on the leading surface to disrupt air flow across the leading surface in a direction that is not parallel to the direction of travel of the jet engine.

In some embodiments, the plurality of plasma actuators may be configured to vary the momentum imparted to the air flowing to the engine intake.

In some embodiments, the plurality of plasma actuators may be configured to vary the momentum imparted to the air flowing over the leading surface.

In some embodiments, the plurality of plasma actuators may be configured such that each plasma actuator may operate independently to vary the momentum imparted to the air flowing over the leading surface.

These and other features of the present disclosure will become more apparent from the following description of the illustrative embodiments.

DETAILED DESCRIPTION OF THE DRAWINGS

Figure 1:
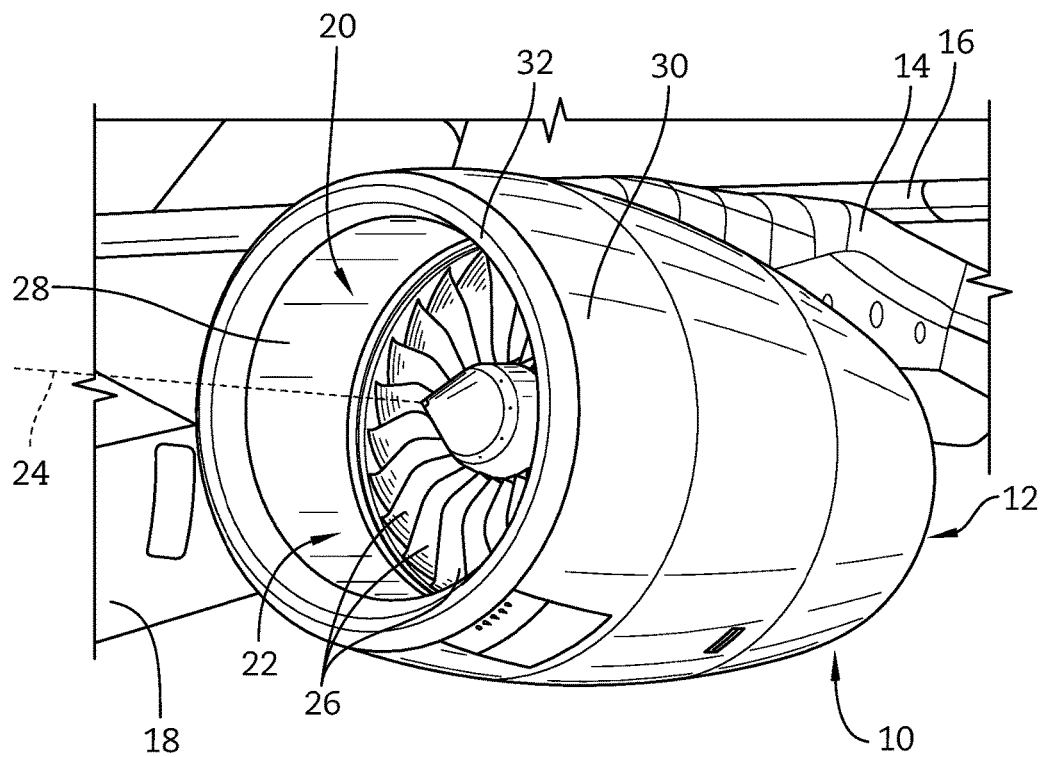
FIG. 1 is a perspective view of a portion of an aircraft, FIG. 1 showing a gas turbine engine for the aircraft, the gas turbine engine including a nacelle and being mounted to a wing of the aircraft.

For the purposes of promoting an understanding of the principles of the disclosure, reference will now be made to a number of illustrative embodiments illustrated in the drawings and specific language will be used to describe the same.

A gas turbine engine embodied as an aircraft engine 10 is mounted to the wing 16 of an aircraft 18 by a mount 14 as shown in FIG. 1. In the illustrative embodiment of FIG. 1, the engine 10 includes a housing 12. The housing 12 includes an outer surface 30, an inner surface 28, and a leading surface 32 that spans between the outer surface 30 and inner surface 28. The leading surface 32 cooperates with the inner surface 28 to define an opening 20 through which air flows into an engine intake 22. The air flowing to the engine intake 22 is initially drawn by a plurality of fan blades 26 which pull the air into the engine 10. After the aircraft 18 begins to move, air flows to the engine intake 22 as a result of both the movement of the aircraft 18 and the fan blades 26 drawing air into the opening 20. The engine 10 has an axis of rotation 24 about which the components of the engine 10 rotate during operation of the engine 10.

Figure 2:
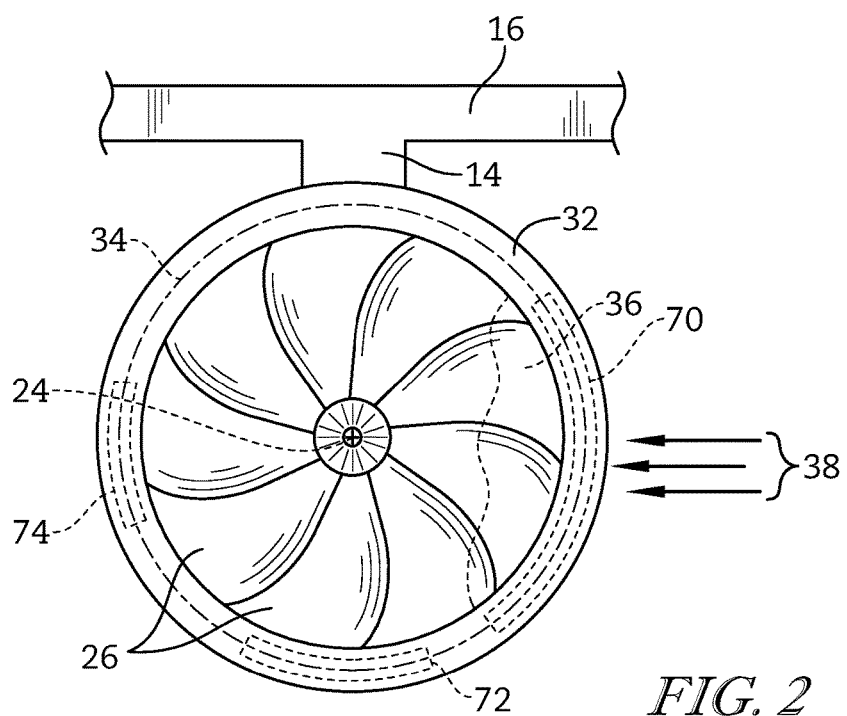
FIG. 2 is a diagrammatic view of the front of an embodiment of a gas turbine engine for an aircraft, the gas turbine engine mounted to the wing of the aircraft.
Figure 3:
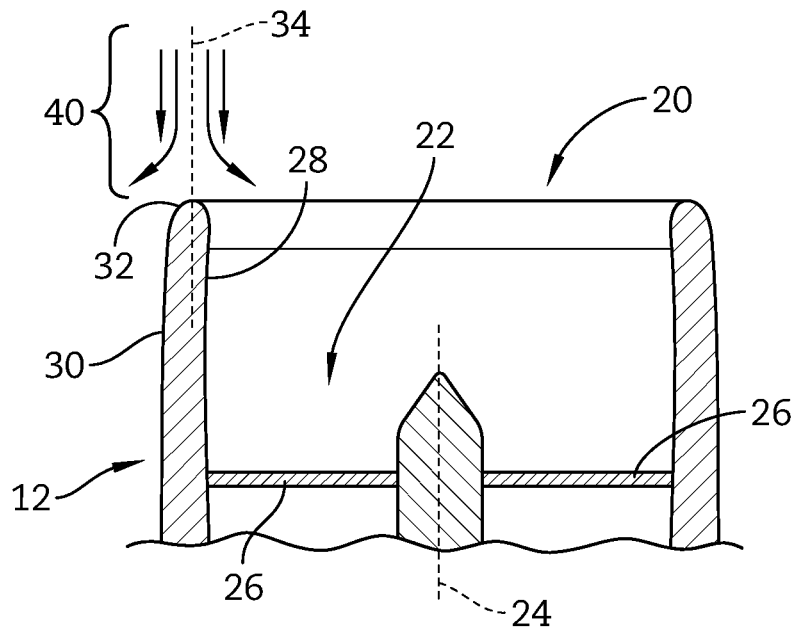
FIG. 3 is a cross-sectional view of the engine of FIG. 2, FIG. 3 showing the flow of air against a portion of the nacelle while the aircraft is at cruising speed.
Figure 4:
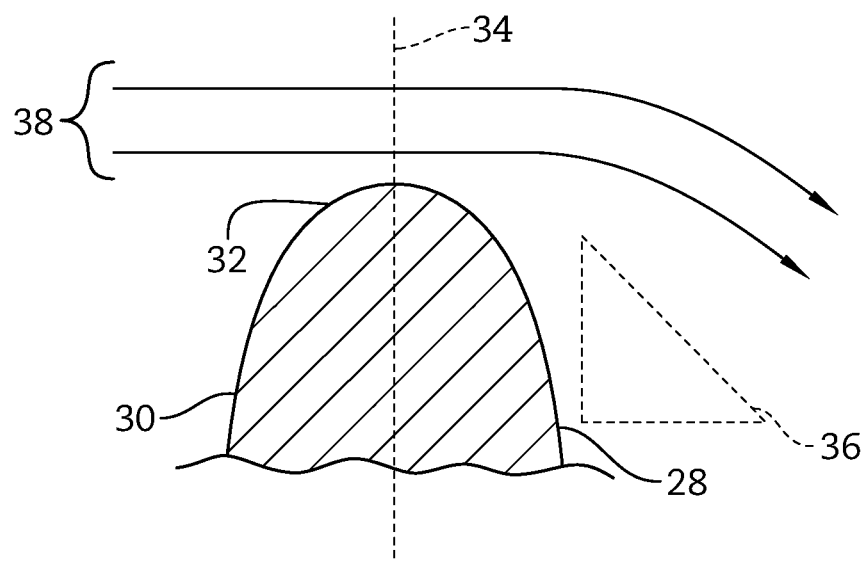
FIG. 4 is a cross-sectional view of a portion of the nacelle of the engine of FIG. 2, FIG. 4 showing the effect of cross-wind flow over the portion of the nacelle.

Referring now to FIGS. 2-4, in operation and during flight of the aircraft 18, air flow 40 impinges upon the leading surface 32 and is directed either along the leading surface 32 to flow over the outer surface 30 or over the inner surface 28 to the engine intake 22. However, stagnation develops in the flow 40 at the point where the flow 40 is perpendicular to the leading surface 32. This occurs at the tangent point of the leading surface 32 and is depicted in the figures as a line of stagnation 34.

Referring to FIG. 2, the present disclosure addresses a condition that occurs when a cross-wind 38 is present during operation of the engine 10 during ground operation. The cross-wind 38, which may be either perpendicular or oblique to the axis of rotation 24, flows over the leading surface 32 and due to high acceleration laminar separation occurs, creating an area of reduced pressure 36 as shown in FIG. 4. During this condition, the area of reduced pressure 36 results in a pressure gradient over the length of the fan blades 26. This pressure gradient causes vibration in the fan blades 26 as they rotate about the axis of rotation 24, subjecting the fan blades 26 to fatigue. As depicted in FIG. 3, the flow 40 into the opening, absent any cross-wind 38, is generally uniform. Referring to FIG. 4, the cross-wind 38 interacts with the incoming flow 40 and the flow over the leading surface 32 results in laminar separation at the boundary layer and thereby causes the area of reduced pressure 36.

Figure 5:
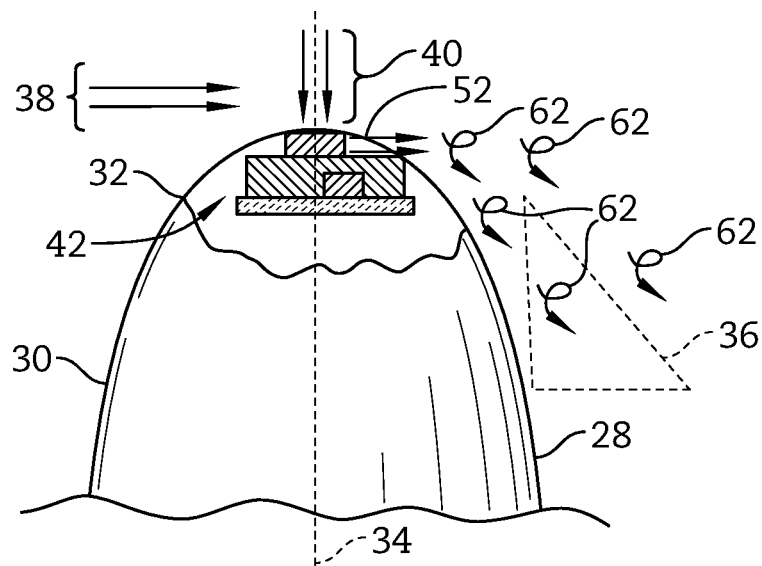
FIG. 5 is a view of a portion of the nacelle of FIG. 1 with portions removed to show a plasma actuator according to the present disclosure.

As shown in FIG. 5, a disruption at the leading surface 32 caused by a plasma actuator 42 perturbs the flow of the boundary layer of the cross-wind 38 to maintain the boundary layer fully turbulent as indicated by arrows 62. The turbulence of the boundary layer is maximized and the laminar separation is reduced, thereby reducing the pressure differential in the area of reduced pressure 36, reducing the pressure gradient experienced by the fan blades 26. As indicated in FIG. 5, the plasma actuator 42 is positioned so that it is centered on the line of stagnation 34 and the disruption occurs just inside the line of stagnation 34. This location reduces the aerodynamic impact at cruising speed because the plasma actuator 42 minimally changes the flowfield at cruise when located on the stagnation line 34.

Figure 6:
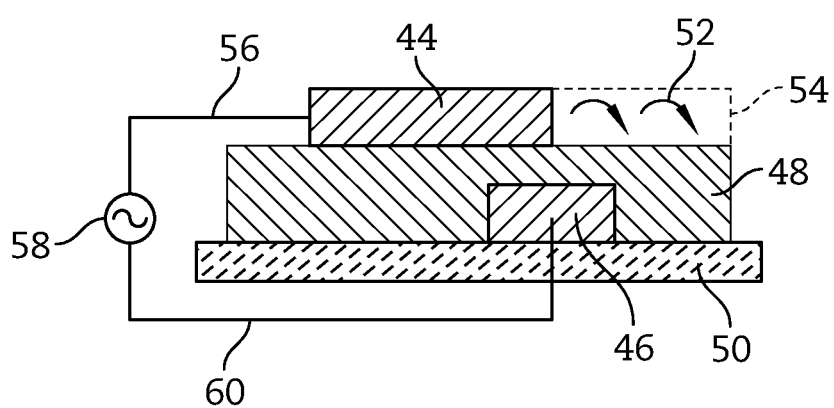
FIG. 6 is a diagrammatic representation of the plasma actuator of FIG. 5.

The plasma actuator 42 is shown in detail in FIG. 6 and includes an exposed electrode 44 and a covered electrode 46 insulated from the exposed electrode 44 by a dielectric 48 all of which are supported on a substrate 50. During operation of the plasma actuator 42, a voltage source 58 is applied to the electrodes 44 and 46 by leads 56 and 60, respectively. As the voltage is applied by the voltage source 58, a plasma discharge 52 is produced in the region 54 above the dielectric. The plasma discharge 52 imparts momentum to the air flowing over the leading surface 32 including the flow 40 and the cross-wind 38 to cause disruptions to the flow and create turbulence 62 as shown in FIG. 5. The turbulence 62 averts the separation that normally occurs in the region 36, thereby reducing the potential for vibration in the blades 26. It should be understood that the plasma actuator 42 is selectively operable and may be variable to increase the level of momentum imparted to respond to changing conditions in the air flow 40 or cross-wind 38 or any other air flows into the engine 10.

Referring again now to FIG. 2, several regions 70, 72, and 74 positioned on the leading surface 32 are identified by dotted lines. Each of the regions 70, 72, and 74 represent locations where one or more plasma actuators, such as plasma actuator 42 may be located. In each location, a flow of air that is perpendicular or oblique to the axis of rotation 24 of the engine 10 may cross the leading surface 32 and create a region of lower pressure as described above with regard to cross-wind 38 and region of reduced pressure 36. It should be understood that each region 70, 72, and 74 may include one or more plasma actuators 42, each plasma actuator 42 operating independently. In such embodiments, the plasma actuators 42 may each be operated at a different charge level, thereby changing the level of perturbation at each plasma actuator 42 to control the momentum imparted to the air flow flowing into the opening 20 of the engine 10. In such cases, the plasma actuators 42 may be tuned to reduce the laminar separation depending on the magnitude and direction of the air flows passing over the leading surface 32. In some embodiments, the location of the plasma actuator 42 may be moved to a different position across the leading surface 32 or inner surface 28 and spaced apart from the line of stagnation 34.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A nacelle for a jet engine comprising
an inner surface defining an opening for air to flow to an engine intake,
an outer surface positioned external to the inner surface,
a leading surface circumscribing the opening, the leading surface connecting the inner surface and the outer surface, the leading surface defining a line of stagnation, and
at least one plasma actuator positioned to disrupt the air flow over the leading surface to reduce laminar separation of air flowing into the engine intake,
wherein the at least one plasma actuator is positioned at the leading surface and centered on the line of stagnation.

2. The nacelle of claim 1, wherein the at least one plasma actuator comprises a plurality of plasma actuators positioned about the opening on the leading surface of the nacelle, the plurality of plasma actuators centered along the line of stagnation.

3. The nacelle of claim 1, wherein the at least one plasma actuator is configured to vary the momentum imparted to the air flowing over the leading surface.

4. The nacelle of claim 3, wherein the at least one plasma actuator comprises a plurality of plasma actuators positioned about the opening on the leading surface of the nacelle, each of the plurality of plasma actuators independently operable to control the momentum imparted to the air flowing over the leading surface at each plasma actuator.

5. The nacelle of claim 1, wherein the at least one plasma actuator positioned on the leading surface includes an exposed electrode, the plasma actuator operable to create a plasma discharge to impart momentum to the air flowing over the leading edge.

6. The nacelle of claim 5, wherein the at least one plasma actuator is variable to increase the level of momentum imparted to disrupt the air flow.

7. The nacelle of claim 6, wherein the at least one plasma actuator comprises a plurality of plasma actuators positioned about the opening on the leading surface of the nacelle, each of the plurality of plasma actuators independently operable to control the momentum imparted to the air flowing over the leading surface at each plasma actuator.

8. A housing for a turbine engine comprising
an opening directing a flow of air to an engine intake, the flow of air being generally parallel to the engine's axis of rotation,
an outer surface having a leading edge defining a line of stagnation, and
a plurality of plasma actuators, each plasma actuator positioned and centered on the line of stagnation to disrupt a flow of air that has a direction that is oblique to the engine's axis of rotation.

9. The housing of claim 8, wherein the plasma actuators positioned at the leading surface and centered along the line of stagnation each includes an exposed electrode, the plasma actuator operable to create a plasma discharge to impart momentum to the air flowing over the leading edge.

10. The housing of claim 9 wherein the plurality of plasma actuators are each configured to vary the momentum imparted to the air flowing over the leading surface.

11. The housing of claim 10, wherein the plurality of plasma actuators are configured such that each plasma actuator is independently operable such that each plasma actuator varies the momentum imparted to the air flowing over the leading surface by each respective plasma actuator.

12. A component for housing for a jet engine comprising
a leading surface that defines a line of stagnation, and
a plurality of plasma actuators positioned on the leading surface and centered on the line of stagnation to disrupt air flow across the leading surface in a direction that is not parallel to the direction of travel of the jet engine.

13. The housing of claim 12, wherein the plurality of plasma actuators each include an exposed electrode, the plasma actuators operable to create a plasma discharge to impart momentum to the air flowing over the leading edge and configured to independently vary the momentum imparted to the air flowing to an engine intake.

14. The housing of claim 13, wherein the plurality of plasma actuators are each configured to vary the momentum imparted to the air flowing over the leading surface.

15. The housing of claim 14, wherein the plurality of plasma actuators are configured such that each plasma actuator is independently operable such that each plasma actuator to vary varies the momentum imparted to the air flowing over the leading surface by each respective plasma actuator.

* * * * *